United States Patent [19]

Honda

[11] Patent Number: 5,233,989
[45] Date of Patent: Aug. 10, 1993

[54] METHOD FOR DISCRIMINATING X-RAY CONTRAST IMAGE FROM NON-CONTRAST IMAGE AND X-RAY IMAGING SYSTEM INCLUDING CONTRAST IMAGE DISCRIMINATING FUNCTION

[75] Inventor: Michitaka Honda, Yaita, Japan

[73] Assignee: Kabushiki Kaisha Toshiba, Kanagawa, Japan

[21] Appl. No.: 778,369

[22] Filed: Oct. 17, 1991

[30] Foreign Application Priority Data

Oct. 18, 1990 [JP] Japan ................................ 2-279674

[51] Int. Cl.⁵ .............................................. H61B 6/00
[52] U.S. Cl. .................................................. 128/653.1
[58] Field of Search ................. 128/653.4, 653.1, 654; 364/413.13, 413.14, 413.16, 413.19, 413.23; 378/4

[56] References Cited

U.S. PATENT DOCUMENTS

| | | | |
|---|---|---|---|
| 4,436,095 | 3/1984 | Kruger | 128/654 |
| 4,437,161 | 3/1984 | Anderson | 364/413.23 |
| 4,459,990 | 7/1984 | Barnea | 128/654 |
| 4,483,342 | 11/1984 | Pfeifer | 128/653.1 |
| 4,636,953 | 1/1987 | Kageyame | 364/413.23 |
| 4,688,175 | 8/1987 | Kaneko et al. | 364/413.23 |
| 4,816,681 | 3/1989 | Shimura | 364/413.23 |
| 5,029,586 | 7/1991 | Honda | 128/654 |

FOREIGN PATENT DOCUMENTS

| | | |
|---|---|---|
| 59-110293 | 6/1984 | Japan . |
| 60-185481 | 9/1985 | Japan . |
| 61-252779 | 11/1986 | Japan . |
| 62-167540 | 7/1987 | Japan . |
| 64-582243 | 3/1989 | Japan . |
| 1-78241 | 7/1989 | Japan . |

OTHER PUBLICATIONS

Japanese Abstract of Japanese Patent Document No. 1-178241, dated Dec. 31, 1987, Patent Abstracts of Japan, 163 C 644.
Japanese Abstract of Japanese Patent Document No. 60-185481, dated Feb. 4, 1985, Patent Abstracts of Japan, 35 E 378.
Japanese Abstract of Japanese Patent Document No. 61-252779, dated May 30, 1985, Patent Abstracts of Japan, 116 E 494.
Japanese Abstract of Japanese Patent Document No. 59-110293, dated Dec. 12, 1982, Patent Abstracts of Japan 86 E 273.
Japanese Abstract of Japanese Patent Document No. 1-58243, dated Aug. 31, 1987, Patent Abstracts of Japan 76 C 606.

Primary Examiner—Lee S. Cohen
Assistant Examiner—Samuel Gilbert
Attorney, Agent, or Firm—Finnegan, Henderson, Farabow, Garrett & Dunner

[57] ABSTRACT

To discriminate a contrast image from a non-contrast image, an X-ray imaging method is characterized by comprising the steps of: acquiring a plurality of X-ray images of a biological body under medical examination; subtracting at least two sets of the X-ray images with each other acquired at temporally different timings to obtain a subtraction image; subdividing one subtraction image into a plurality of image blocks; calculating an averaged value of image concentration with respect to each of the image blocks, thereby obtaining a plurality of averaged values for the subdivided image blocks; calculating a difference between at least two averaged values of image concentration with respect to the image blocks acquired within substantially same temporal timing period; and, judging whether or not the X-ray image is acquired under such a condition that an X-ray contrast medium appears therein based upon the difference in said two averaged values of image concentration.

13 Claims, 15 Drawing Sheets

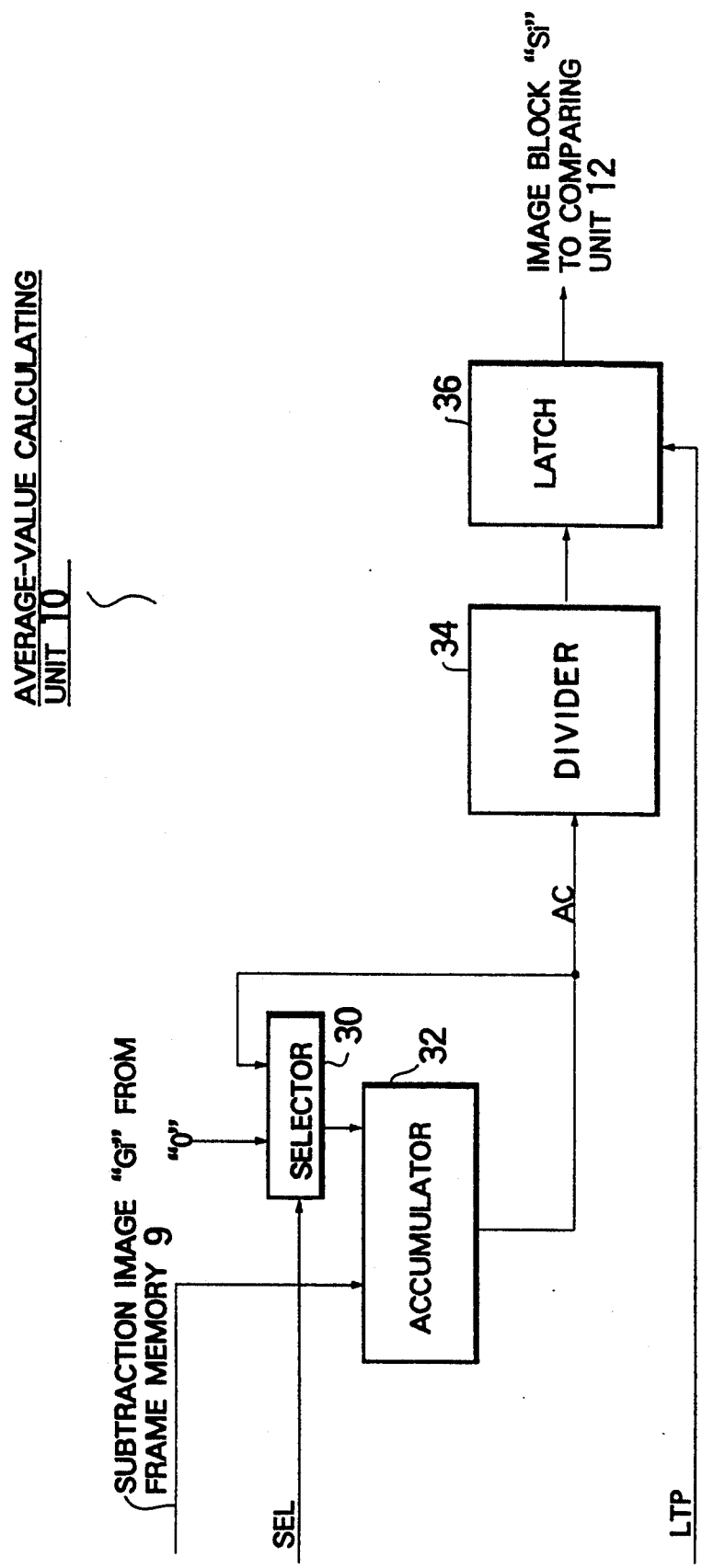

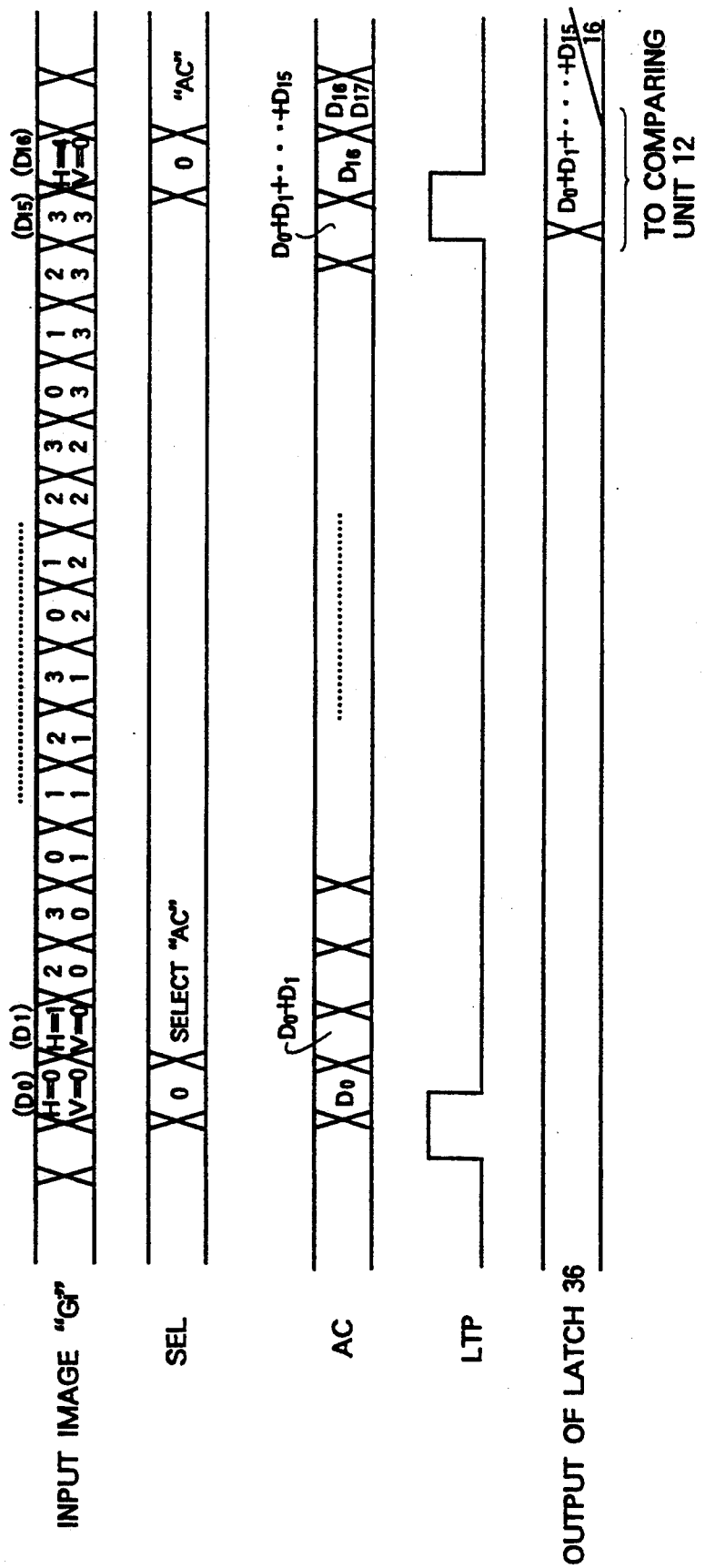

FIG. 6

IMAGE BLOCK DATA "Si"

| | | | |
|---|---|---|---|
| 10 | 5 | 0 | -1 |
| 0 | 2 | -8 | -1 |
| -1 | -2 | -7 | -1 |
| 0 | -1 | 0 | 0 | b00 (top-left), b03 (top-right), b10 (second row left), b33 (bottom-right)

FIG. 7

CODED IMAGE DATA "Bi"

| | | | |
|---|---|---|---|
| + | + | 0 | 0 |
| 0 | 0 | − | 0 |
| 0 | 0 | − | 0 |
| 0 | 0 | 0 | 0 | b00 (top-left), b03 (top-right), b10 (second row left), b33 (bottom-right)

FIRST THRESHOLD $T_1 = -5$
SECOND THRESHOLD $T_2 = +5$

FIG.11

|  | "n" PIECES | |
|---|---|---|
| 1st PATTERN | 0 0 0 0 0 0 0 0 | → CODE "0" |
| 2nd PATTERN | 0 0 − − 0 + + 0 | → CODE "1" |
| 3rd PATTERN | 0 0 + + + + 0 0 | → CODE "2" |
| 4th PATTERN | 0 0 − + 0 + + 0 | → CODE "3" |
| 5th PATTERN | 0 − − − − 0 + + | → CODE "4" |
| ⋮ | | ⋮ |
| nth PATTERN | + + + 0 0 0 − − | → CODE "n" |

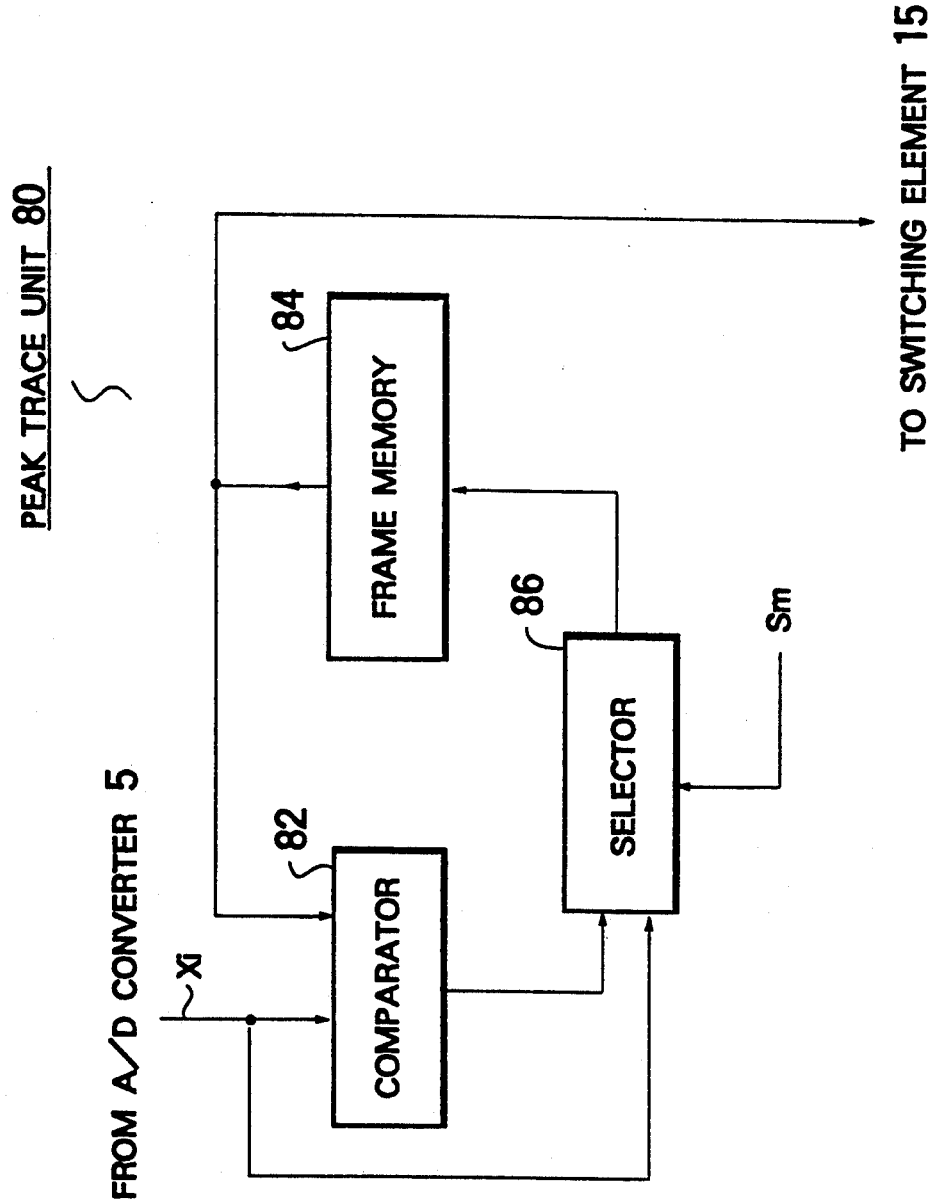

METHOD FOR DISCRIMINATING X-RAY CONTRAST IMAGE FROM NON-CONTRAST IMAGE AND X-RAY IMAGING SYSTEM INCLUDING CONTRAST IMAGE DISCRIMINATING FUNCTION

BACKGROUND OF THE INVENTION

1. Field of the Invention

The present invention generally relates to an X-ray imaging method and an X-ray imaging system capable of discriminating an X-ray contrast image from a non-contrast image. More specifically, the present invention is directed to an X-ray imaging method and an X-ray imaging system for judging whether or not an X-ray contrast image of a biological body under medical examination can be acquired during X-ray imaging operation by checking temporal variations contained in averaged values of image concentration with respect to subdivided X-ray image regions.

2. Description of the Prior Art

In the X-ray imaging systems, an X-ray contrast medium is injected via a blood vessel into an imaging region of a biological body under examination while inserting a catheter, a guide article, a wire and the like into the blood vessel thereof, and projecting X-rays to these imaging region and blood vessels so as to acquire a series of X-ray images.

In such X-ray imaging system with employment of the X-ray contrast medium, there are the following difficulties. That is, since the X-ray contrast medium quickly disappears from such an imaging region after injection operation of the X-ray contrast medium, it is absolutely necessary to correctly detect insertion timings of X-ray contrast medium in order to acquire X-ray images of the imaging region with which the X-ray contrast medium is mixed (so-called "contrast images").

Various ideas to detect such injection timings of the X-ray contrast medium have been proposed.

As to the first timing detection method, the variations in the averaged value of image concentration, or density for the overall imaging region are processed to detect such an insertion timing of the X-ray contrast medium. This conventional detecting method is realized based upon such a phenomenon that when the X-ray contrast medium is injected into the imaging region, the averaged value of the image concentration with respect to the overall imaging region is lowered. The first detecting method is known from, for instance, Japanese KOKAI (DISCLOSURE) patent application NO. 64-58243 opened in 1989.

As to the second timing detection method, upon injection of the X-ray contrast medium an operator immediately turns off the X-ray imaging switch, and the X-ray image acquired just before the imaging switch is turned off is held (so-called "last image holding method"). This second detecting method is described in, for example, Japanese KOKAI patent application NO. 60-185481 (1985).

In the first detecting method, however, there is such a problem that since the averaged value of image concentration for the entire imaging region is utilized so as to detect the injection timings of the X-ray contrast medium, erroneous detecting operation may happen to occur if a biological body under medical examination is positionally shifted or moved.

Furthermore, the second detecting method has another problem that since turning off the X-ray imaging switch must be carried out in synchronism with the injection operation of the X-ray contrast medium, very cumbersome operations are necessarily required of any operators.

The present invention has been made in an attempt to solve the above-described various problems, and therefore has an object to provide an X-ray imaging method and an X-ray imaging apparatus capable of discriminating a contrast image from a non-contrast image even when a biological body under medical examination is positionally shifted.

To achieve the above-described object and features of the present invention, an X-ray imaging method is characterized by comprising the steps of:

acquiring a plurality of X-ray images ($X_i$) of a biological body (20) under medical examination;

subtracting at least two sets of the X-ray images ($X_i$:$x_{i-1}$) with each other acquired at temporally different timings to obtain a subtraction image ($G_i$);

subdividing one subtraction image ($G_i$) into a plurality of image blocks ($B_{00}$:$B_{33}$);

calculating an averaged value of image concentration with respect to each of the image blocks ($B_{00}$:$B_{33}$), thereby obtaining a plurality of averaged values for the subdivided image blocks ($B_{00}$:$B_{33}$);

calculating a difference between at least two averaged values of image concentration with respect to the image blocks ($B_{00}$:$B_{33}$) acquired within substantially same temporal timing period; and, judging whether or not the X-ray image ($X_i$) is acquired under such a condition that an X-ray contrast medium appears therein based upon the difference in said two averaged values of image concentration.

Furthermore, an X-ray imaging system (100:200), according to the present invention, comprises:

means (1:3) for producing a plurality of X-ray images ($X_i$) of a biological body (20) under medical examination;

subtraction means (8) for subtracting at least two sets of the X-ray images ($X_i$:$X_{i-1}$) with each other produced at temporally different timings to obtain subtraction image ($G_i$);

averaging means (10) for obtaining an averaged value of image concentration for each of image blocks ($B_{00}$:$B_{33}$) subdivided from one subtraction image ($G_i$), thereby obtaining a plurality of averaged values for the subdivided image blocks ($B_{00}$:$B_{33}$);

calculating means (11:12) for calculating a difference between at least two averaged values of image concentration with respect to the image blocks ($B_{00}$:$B_{33}$) acquired within substantially same temporal timing period; and, judging means (14:50) for judging whether or not the X-ray image ($X_i$) is acquired under such a condition that an X-ray contrast medium appears therein based upon the difference in said two averaged values of image concentration.

BRIEF DESCRIPTION OF THE DRAWINGS

For a better understanding of the present invention, reference is made of the following detailed descriptions in conjunction with the drawings, in which:

FIGS. 4A and 4B are an internal circuit arrangement and a timing chart of the average-value calculating unit employed in the first X-ray imaging system (100);

FIG. 6 pictorically shows image block data "$S_i$" obtained in the first X-ray imaging system (100);

FIG. 7 pictorically shows coded image data "$B_i$" obtained in the first X-ray imaging system (100);

FIG. 11 schematically represents a pattern/code conversion table employed in the first X-ray imaging system (100);

DETAILED DESCRIPTION OF THE PREFERRED EMBODIMENTS

Recognition

The present invention has been achieved based upon the following recognition.

A single image region is subdivided into a plurality of image blocks, for instance, 16 (i.e., 4×4) image blocks. Since an average value of concentration or density is calculated with respect to each of image block data, precision on judging whether or not a contrast medium is injected can be improved with respect to the respective image block data.

In general, it is known that temporal variations of averaged concentration values obtained when the contrast medium is injected into, for example, a blood vessel of a biological body under medical examination, are clearly discriminatable from those obtained when the biological body is moved from one place to another place within an X-ray diagnostic region. Accordingly, a judging means according to the present invention can correctly judge whether or not the contrast medium is actually injected into the blood vessel based on the temporal variations in the averaged concentration values for the respective image blocks.

Entire Arrangement of First X-ray Imaging System

Figure 1:
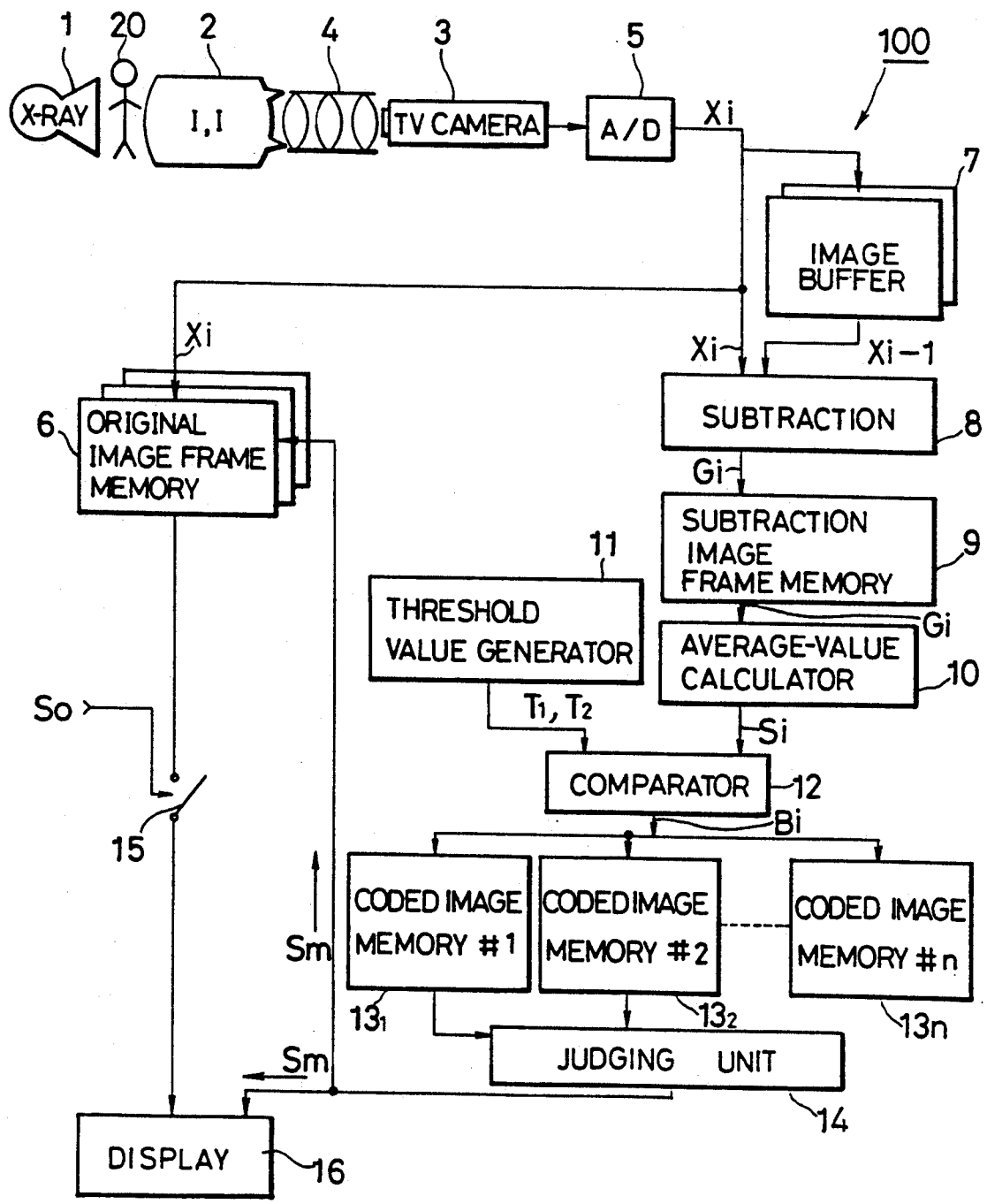
FIG. 1 is a schematic block diagram for showing an overall arrangement of an X-ray imaging system (100) according to a first preferred embodiment of the present invention.

Referring now to FIG. 1, an entire arrangement of an X-ray imaging system 100 according to a first preferred embodiment of the present invention will be described.

An X-ray imaging system 100, according to the first preferred embodiment of the present invention, comprises: X-rays tube 1 for generating an X-ray; an image intensifier 2 for detecting X-rays generated from the X-ray tube 1 and then transmitted through a biological body 20 under medical examination to convert the detected X-ray image of the biological body 20 into an optical image thereof; a television camera 3 for accepting the optical image via an optical system 4; an analog-to-digital converter 5 for A/D-converting a television (X-ray) image signal into corresponding digital X-ray image data "$X_i$"; a original image frame memory 6 for storing the digital X-ray image data $X_i$ as original image data; and a pair of image buffer memories 7 for temporarily storing the digital X-ray image data $X_i$ derived from the A/D converter 5.

Figure 2:
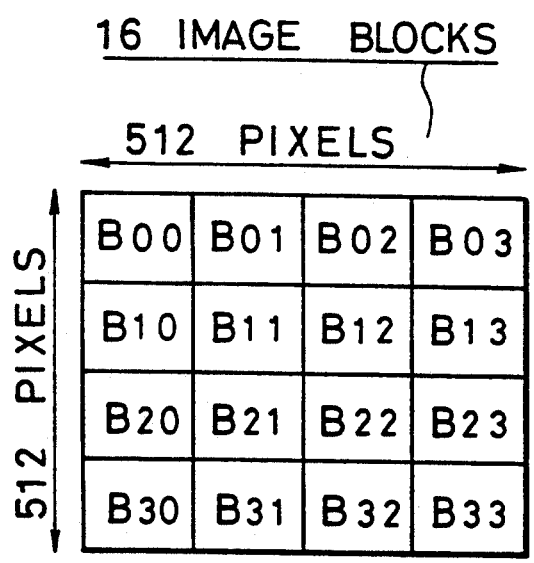
FIG. 2 is an imaging region subdivided into 16 image blocks, used for explaining operation of the first X-ray imaging system (100)

The first X-ray imaging system 100 further comprises: a subtracting unit 8 for subtracting one digital X-ray image data "$X_i$" which is directly derived from the analog to digital convertor 5, from another digital X-ray image data "$X_{i-l}$" which is derived from the image buffer 7 and delayed by 1 frame period as compared with the first-mentioned X-ray image data "$X_i$" to obtain subtraction image data "$G_i$"; a subtraction image frame memory 9 for subdividing the subtracted image constructed in, for instance, a 512×512 matrix form into 16 image blocks "$B_{00}$" to "$B_{33}$") as represented in FIG. 2, and for storing the subtraction image data; and an average value calculating unit 10 for calculating averaged concentration of the subtraction image data "$G_i$" with respect to each of the subdivided image blocks "$B_{00}$" to "$B_{33}$"; thereby obtaining the image block data "$S_i$".

This first X-ray imaging system 100 furthermore includes: a threshold value generating unit 11 for generating two sets of threshold values "$T_1$ and "$T_2$"; a comparating unit 12 for comparing the averaged concentration of each image block with two sets of threshold values "$T_1$ and "$T_2$", thereby obtaining coded image data "$B_i$"; a plurality of coded image data memories 13n ("n" being an integer) for storing the coded image data successively derived from the comparing unit 12; a judging unit 14 for judging whether or not the coded image data corresponds to contrast image data and for issuing a mixture signal "$S_m$" (i.e., a contrast medium is mixed with one original image "$X_i$"). This mixture signal "$S_m$" is supplied to both the original image frame memory 6 and a display unit 16. A switching element 15 is also employed in the first X-ray imaging system 100.

When an operator transmits an operation signal "$S_0$" to this switching element 15 and at the same time, the mixture signal "$S_m$" is supplied to the original image frame memory 6, this switching element 15 is turned ON (closed) whereby the original image data are successively supplied via the switching element 15 to the display unit 16.

The threshold value generating unit 11 previously determines a first threshold value "$T_1$" and a second threshold value by way of simulation or the like. The first threshold value "$T_1$" is determined for the subtraction value when the X-ray contrast medium is injected into the relevant block portion (see FIG. 2), whereas the second threshold value "$T_2$" is determined for the subtraction value when the X-ray contrast medium has flown out of the relevant block portion and now disappears therefrom. In the first preferred embodiment, a relationship between the first and second threshold values $T_1$ and $T_2$ is determined as follows:

$$T_2 > T_1$$

Internal Circuit Arrangements of Featured Circuit Arrangements Employed in First X-ray Imaging System 100

Internal circuit arrangements, or detailed operations of the featured circuit arrangements employed in the first preferred embodiment, namely the subtracting unit 8, average-value calculating unit 10, threshold-value generating unit 11, comparing unit 12, and judging unit 14 will now be described more in detail.

Figure 3:
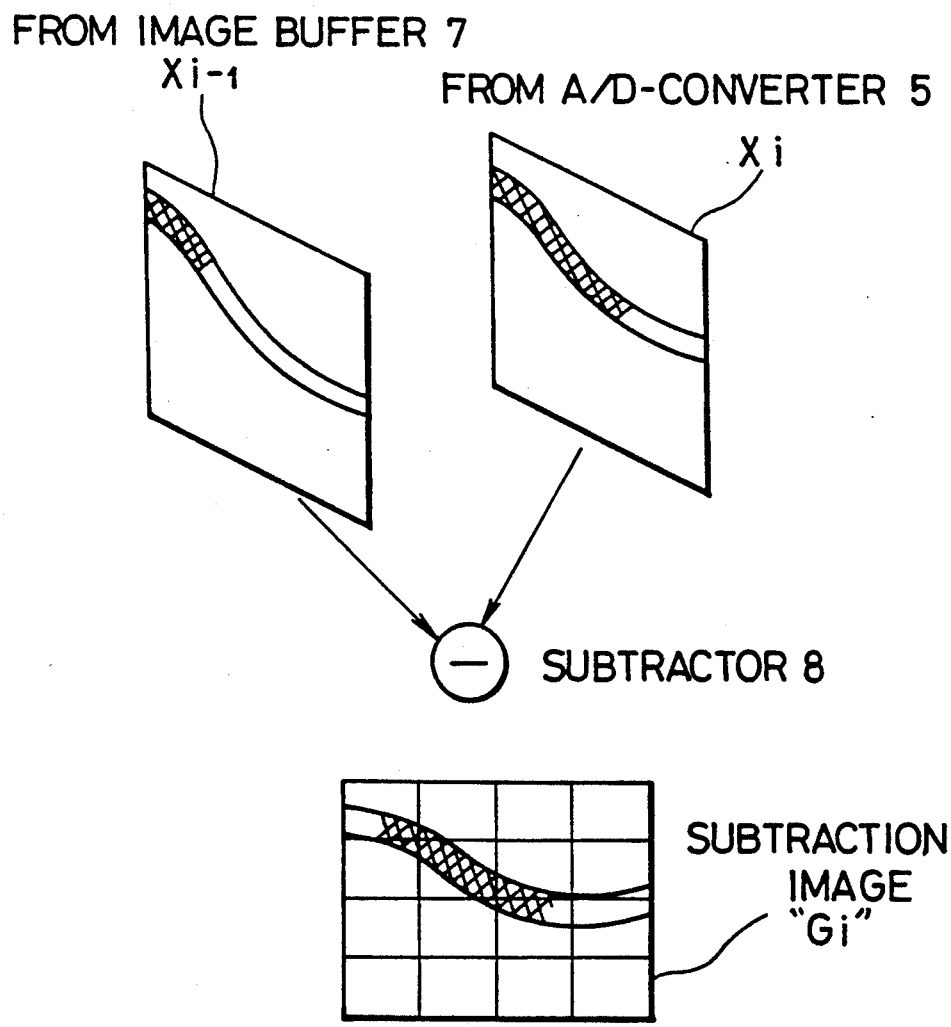
FIG. 3 pictorially shows how to produce subtraction image data "$G_i$" in the first X-ray imaging system (100)

FIG. 3 pictorially represents subtracting operation performed by the subtracting unit 8. In FIG. 3, the original image data "$X_i$" derived from the A/D-converter 5 is subtracted from another original image data "$X_{i-1}$" which has been stored in the image buffer memory 7 and is delayed by 1 frame period from the first-mentioned original image data "$X_i$", so that the subtraction image data "$G_i$" is obtained. It should be noted that hatched portions shown in FIG. 3 indicate regions within the biological body 20, into which contrast mediums have been injected or mixed with. Alternatively, if there is substantially no movement in the biological body 20, any X-ray image data other than the above-described image data "$X_{i-1}$" acquired before 1 frame period of the image data "$X_i$" may be utilized as the subtracting image data.

Figure 5:
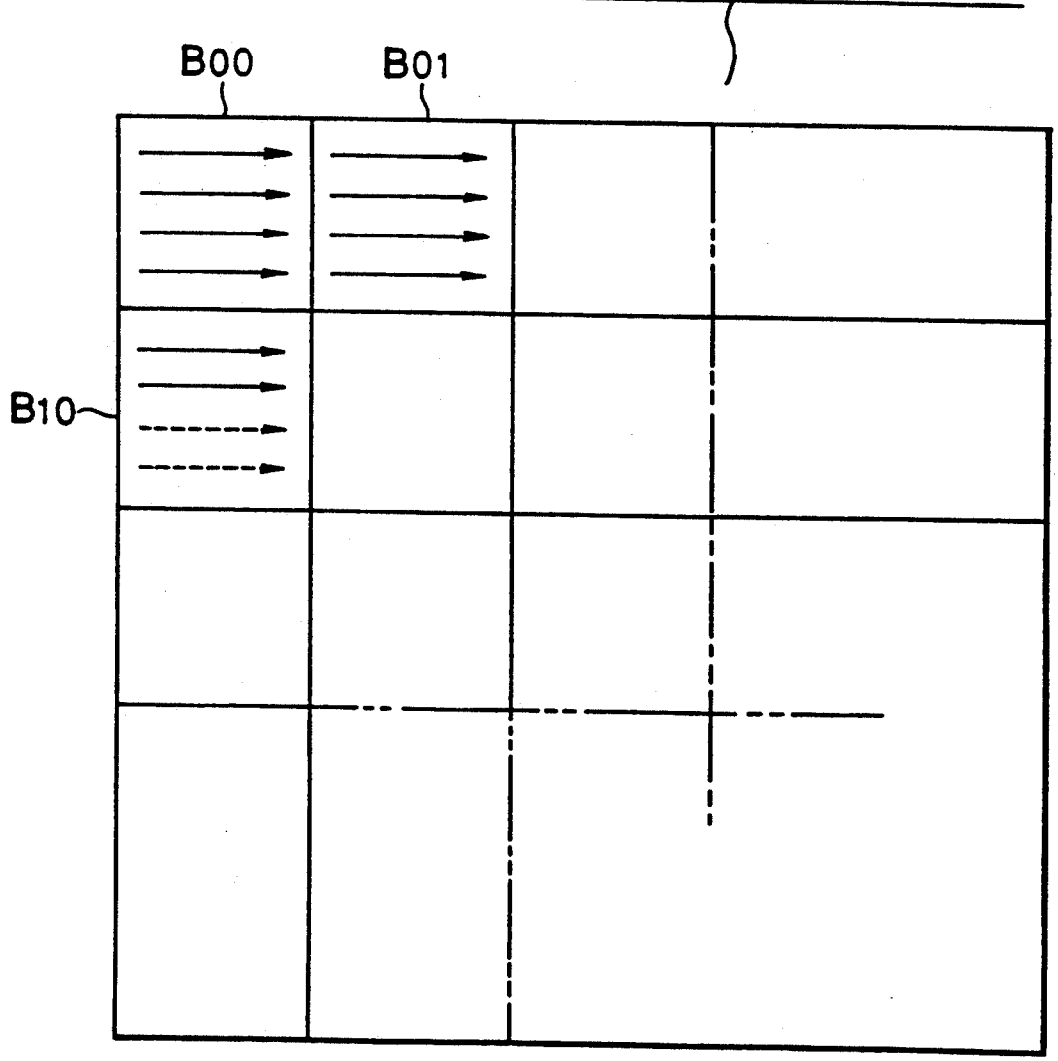
FIG. 5 pictorically explains the reading method for the subtraction image frame memory 9 employed in the first X-ray imaging system (100)

FIG. 4A is a schematic block diagram for representing an internal circuit of the average value calculating unit 10 and FIG. 4B is a timing chart for explaining operations of the average value calculating unit 10. FIG. 5 illustrates a reading sequence of image data "$G_i$" stored in the subtraction image frame memory 9.

In FIG. 4A, the average value calculating unit 10 is constructed of a selector 30, an accummulator 32, a divider 34 and a latch circuit 36. The selector 30 receives "0" signal, a selecting signal "SEL" (see FIG. 4B) and accumulated image data from the accumulator 32. The accumulator 32 receives the subtraction image data "$G_i$" from the frame memory 9. The latch circuit 35 latches the image block data "$S_i$" derived from the divider 34 in response to a latch pulse "LTP" (see FIG. 4B).

As represented in FIG. 4B, the subtraction image data "$G_i$" (indicated by $D_0, D_1, \text{---}, D_{16}$) are accumulated in the accumulator 32. It should be noted that symbol "H" denotes a horizontal address of the frame memory 9, whereas symbol "V" indicates a vertical address thereof. In response to the selecting signal "SEL", the accumulated image data are selected from the accumulator 32 under control of the selector 30. Then, the selected image data are latched in the latch circuit 36 and the predetermined image data are derived therefrom (see FIG. 4B). The resultant image data derived from the latch circuit 36 are represented in FIG. 6.

That is, as shown in FIG. 6, averaged concentration of the image data within each of these blocks "$b_{00}$", "$b_{01}$", ---, "$b_{33}$" with respect to the subtraction image data "$G_i$" (see FIG. 3), and then the image block data "$S_i$" are formed. In the respective image block data "$S_i$", a block portion from which the contrast medium has flown and disappears is indicated by a pulse value (for instance, "10" for the block portion "$b_{00}$"). Conversely, a block portion into which the contrast medium is injected is represented by a minus value (for instance, "$-1$" for the block portion "$b_{03}$".) Another block portion in which no contrast medium flows is indicated by zero.

The function of the comparing unit 12 is to convert the image block data "$S_i$" outputted from the average value calculating unit 12 into coded image data "$B_i$" as shown in, for instance, FIG. 7, constructed of codes "$-$", "0", and "$+$". That is, if an averaged value of image data within the respective blocks "$b_{00}$", "$b_{01}$", ---, "$b_{33}$" is smaller than, or equal to the first threshold value "$T_1$", the code "$-$" is selected. If another averaged value of image data is present in between the first and second threshold values $T_1$ and $T_2$, then the code "0" is selected. If another averaged value of image data is greater than, or equal to the second threshold value $T_2$, the code "$+$" is selected. For example, when the first threshold value $T_1$ is selected to be "$-5$" and the second threshold value $T_2$ is selected to be "$+5$", the image block data "$S_i$" shown in FIG. 6 are converted into the coded image data "$B_i$" as shown in FIG. 7.

The above-described comparing operation (namely, converting operation) by the comparing unit 12 is carried out every time the image frame is changed, so that the coded image data "$B_i$" are sequentially stored into the coded image memory 13 constructed of "n" pieces of memories $13_n$ ("n" being an integer) every time single frame image data is coded. Such a storage operation of the coded image data is pictorically represented in FIG. 8.

Figure 8:
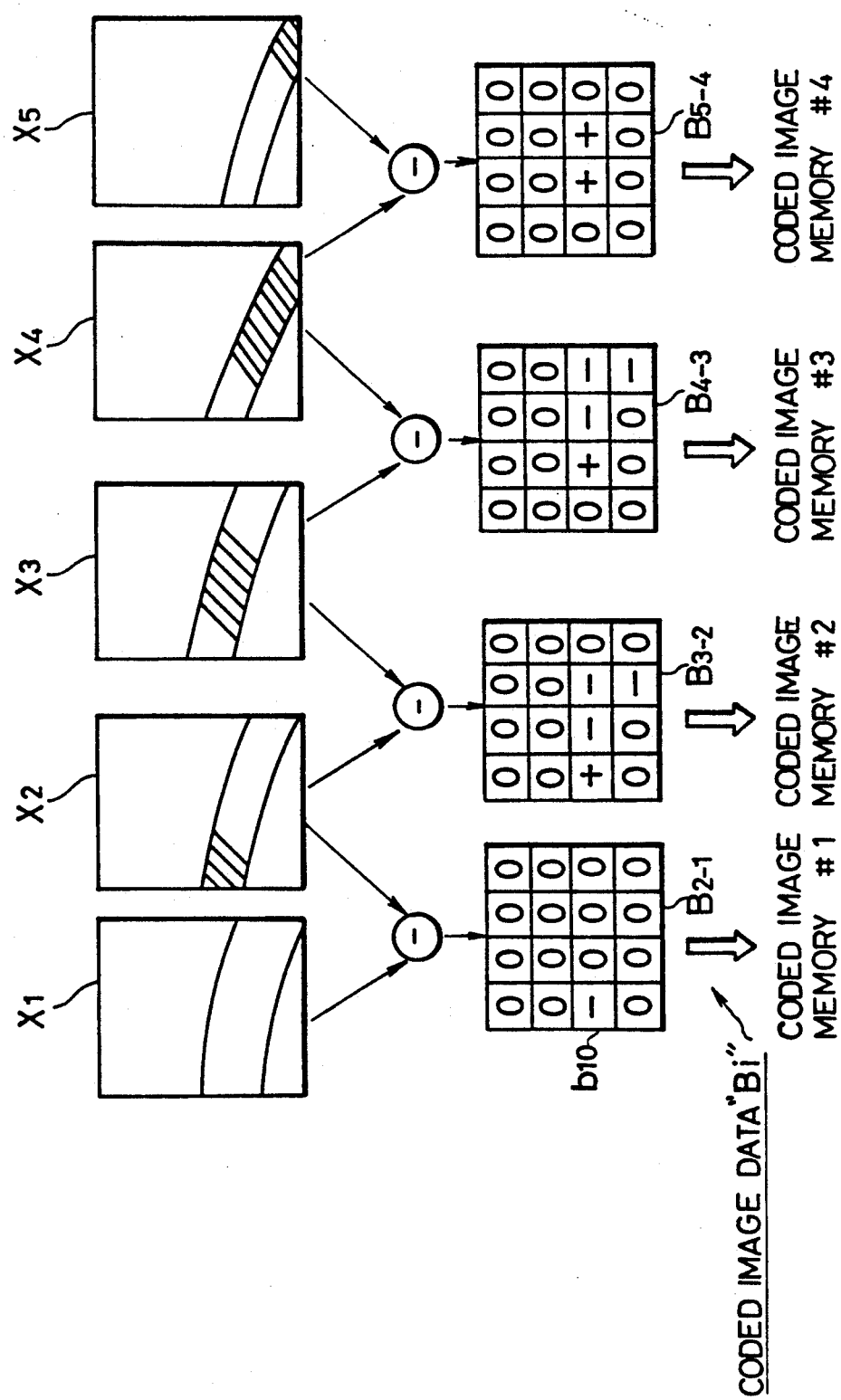
FIG. 8 pictorically explains how to produce the coded image data "$B_i$" in the first X-ray imaging system (100)

In FIG. 8, for instance, as a result of subtraction between first original image data "$X_1$" and second original image data "$X_2$", first coded image data "$B_{2-1}$" is stored into the first coded image memory (#1) $13_2$. Next, when the subtraction is performed between the second original image data "$X_2$" and the third original image data "$X_3$", second coded image data "$B_{3-2}$" is stored into the second coded image memory (#2) $13_2$. Similarly, after the subsequent subtraction operations between the original image data $X_4$ and $X_5$ have been performed, the resultant coded image data "$B_{4-3}$" and "$B_{5-4}$" are stored into the third and fourth coded image memory (#3, #4) $13_3$ and $13_4$.

When the storage operation for the last coded image memory (#n) $13_n$ has been completed, the next storage operation is returned to the first coded image memory (#1) $13_1$ and the coded image data written therein during the last storage operation may be rewritten by the latest coded image data under control of the comparing unit 12.

Internal Arrangement of Judging Unit

As previously explained, the judging unit 14 has such a function to determine whether a present image corresponds to an original image or a contrast image based upon temporally-changing conditions of the coded image data "$B_i$" as shown in, for instance, FIG. 8. A typical pattern of mixing with a contrast medium is varied as follows, observing one image block, e.g., "$b_{10}$" among the respective coded image data "$B_i$" over "n" frame periods. The coded symbol is necessarily changed from "0" to "$-$" and thereafter becomes "$+$" and finally becomes "0".

Figure 9:
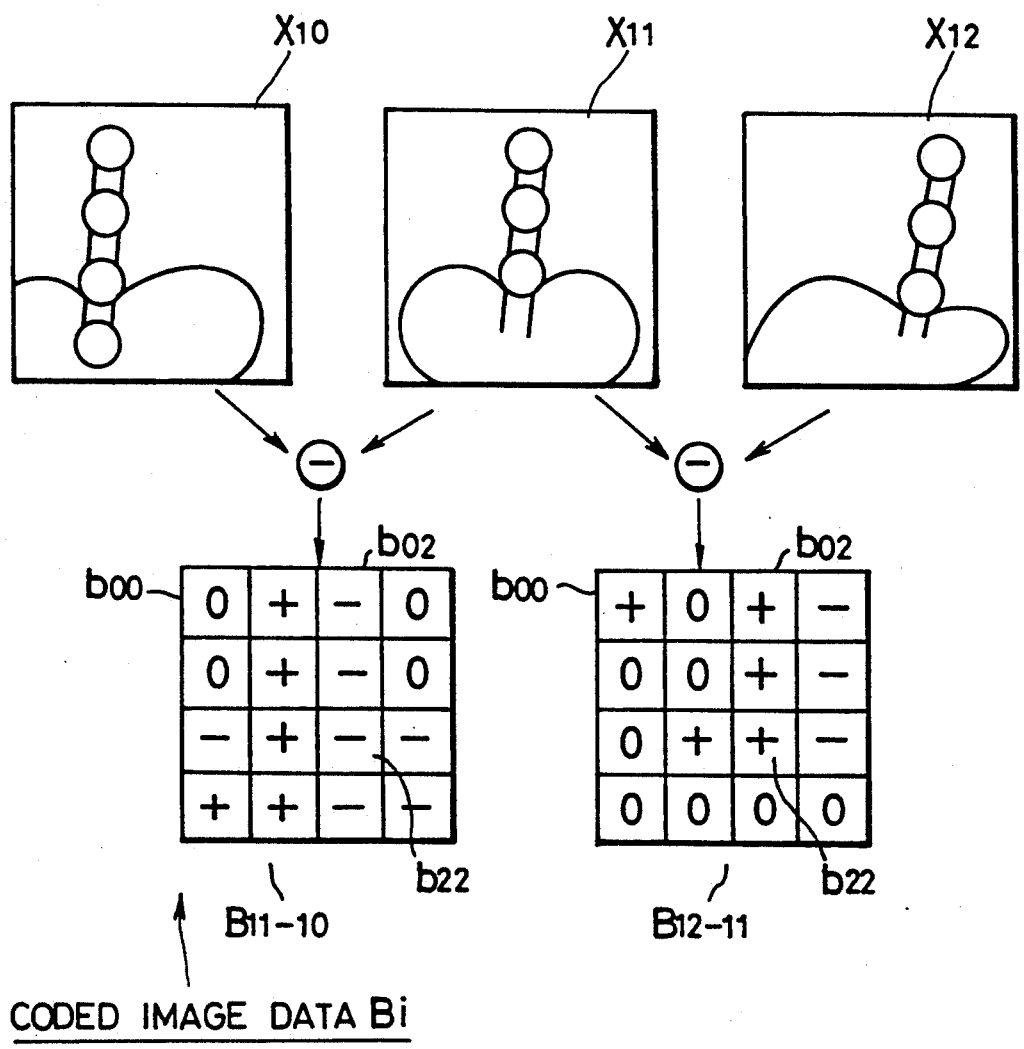
FIG. 9 pictorically explains how to produce another coded image data "$B_i$" in the first X-ray imaging system (100)

Assuming now that X-ray images of the biological body 20 are varied from $X_{10}$ to $X_{12}$ shown in FIG. 9, or an inserting article such as a catheter (not shown in detail) is moved within the biological body 20, some of image blocks in the coded image data $B_{11\text{-}10}$ and $B_{12\text{-}11}$ are suddenly changed. For instance, the coded symbol of the image block "b" is changed from "0" to "+". The coded symbol of the image block "$b_{02}$" is varied from "−" to "0". Also, the coded symbol of the image block "$b_{22}$" is changed from "−" to "+". As easily understood from the foregoing descriptions, such rapid symbol variations are completely different from the symbol variations caused by injecting the contrast medium into the biological body 20. As a consequence, it can be correctly judged whether or not the present image corresponds to the original image (namely, neither an image without a contrast medium, nor an image with a catheter) by investigating the coded symbol variations with respect to time lapse.

Figure 10:
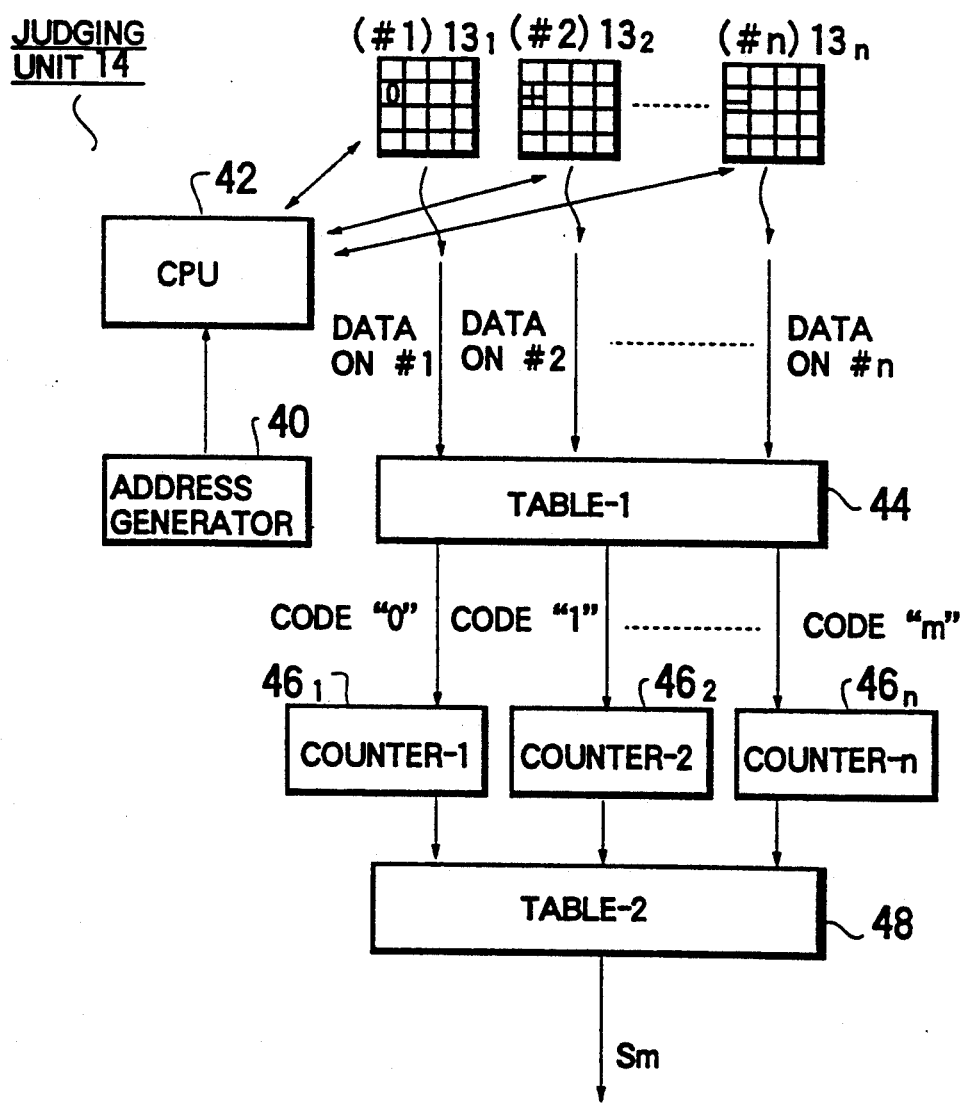
FIG. 10 schematically represents an internal circuit arrangement of the judging unit 14 employed in the first X-ray imaging system (100)

Referring now to FIGS. 10 and 11, the above-described judging operation for the coded symbol variations will be described more in detail.

In FIG. 10, there is shown an internal circuit arrangement of the above-described judging unit 14. The judging unit 14 is arranged by: an address generator 40 for generating address data which will be supplied via a central processing unit 42 to the respective coded-image data memories $13_1$ ---, $13_n$; a first table memory 44 for receiving the coded image data to extract a featured amount (i.e., a pattern of symbol codes) of each coded image data; "n" pieces of counters $46_1$, ---, $46_n$ for counting preselected codes, such as a code 1, contained in the respective featured amounts; and also a second table memory 48 for receiving the count values obtained from the respective counters $46_1$, ---, $46_n$ in order to judge whether or not a contrast image is acquired based upon a second code pattern table stored therein.

FIG. 11 pictorically represents a pattern/code conversion idea executed in the first table memory 44.

Contrast Image Judgement

The overall judging operation effected by the judging unit 14 will now be described with reference to FIGS. 10 and 11.

In FIG. 10, under control of CPU 42, the same address data are simultaneously generated by the address generator 42 and then are simultaneously supplied to the coded-image data memories $13_1$, ---, $13_n$. As a result, the coded image data (for instance, +, −, O shown in FIG. 7) are simultaneously read out from the memory regions each having the same address, within the respective coded-image data memories $13_1$, ---, $13_n$.

Then, the coded-image data read from the memory regions having the same addresses are supplied to the first table memory 44, whereby the featured amounts of these coded-image data are extracted as follows. As shown in FIG. 11, for instance, if the coded-image data representative of a first pattern is supplied to a first conversion table stored in the first table memory 44, so that since the first pattern corresponds to a code "0", a code-0-signal is produced based on the first conversion table, and this code-0-signal is supplied to the first counter $46_1$. Similarly, if the coded-image data indicative of a fourth pattern is, for instance, received by the first table memory 44, a code-3-signal is produced therefrom and supplied to the third counter $46_3$.

The above-described code conversion and code counting operations are simultaneously performed. That is, after all of the coded-image data read out from all of the memory regions having the same addresses have been processed by the code conversion idea, only one code signal is obtained which is counted by only one relevant counter 46.

Subsequently, the address generator generates another address data, so that the coded-image data are simultaneously read out from the memory regions each having the same address of the coded-image data memories $13_1$, ---, $13_n$. As a result, another code signal is produced and counted by the relevant counter 46.

Such a code conversion/code counting operation is carried out up to the final address of the coded-image data memory 13.

Next, a total number of each code counted by the respective counters 46 is obtained, which will be supplied to the second table memory 48.

In the second table memory 48, the second conversion table is previously stored. Based upon this second conversion table, the mixture signal "$S_m$" is produced. That is, for instance, if the total quantity of code-3-signal is greater than or equal to "$K_1$" ($K_1=10$), and also the total numbers of code-1-signal, code-3-signal and code-4-signal are smaller than or equal to $K_2$ ($K_2=25$), it may be judged that the contrast medium is flown into the relevant image of the biological body 20. Therefore, the mixture signal "$S_m$" is produced from the second table memory 48.

Also if the total number of code-2-signal or code-3-signal is considerably higher than "$K_2$", then no mixture signal "$S_m$" is produced and it may be judged that the biological body 20 is positionally shifted.

Overall Operation of First X-ray Imaging System

Figure 12:
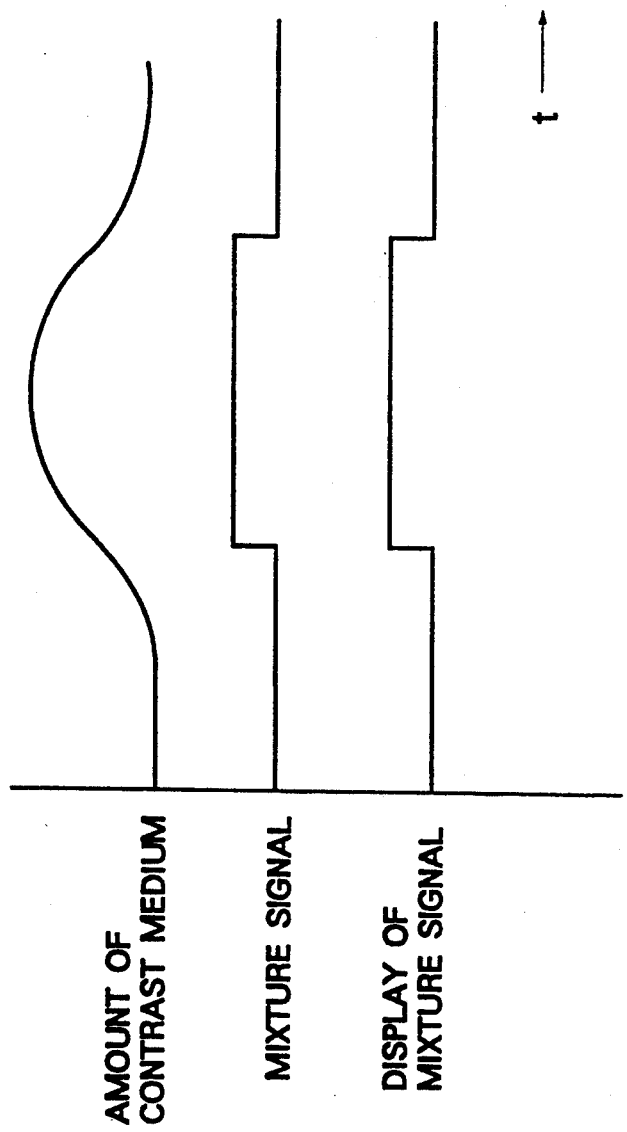
FIG. 12 is a timing chart for the mixture signal "$S_m$" and distribution states of contrast medium.

An overall operation of the first X-ray imaging system 100 will now be summarized with reference to another drawing, FIG. 12.

FIG. 12 represents temporal variations in an amount of a contrast medium in comparison with generation timing of the mixture signal "$S_m$".

In the entire arrangement of the first X-ray imaging system 100 shown in FIG. 1, while performing the X-ray imaging operation by an operator, a small quantity of X-ray contrast medium is injected into the biological body 20 so that the operation signal "$S_0$" is issued. A series of X-ray images of the biological body 20 are successively produced from the X-ray tube 1 and the image intensifier 2, and thereafter converted into a series of X-ray image signals in the television camera 3. Thus, a series of X-ray image data "$X_i$" are derived from the A/D converter 5 and stored into both the original image frame memory 6 and the image buffer memories 7.

It should be noted that these X-ray image data "$X_i$" contain X-ray image information with various conditions, namely, X-ray images before the contrast medium is injected, X-ray images with the contrast medium (i.e., contrast images), and X-ray images after the contrast medium disappears.

To produce the coded image data "$B_i$", the X-ray image data $X_i$ is temporarily stored in the image buffer 7 and also supplied to the subtracting unit 8. The subtracting unit 8 executes the subtraction operation between the X-ray image data "$X_i$" and the delayed X-ray image data "$X_{i\text{-}1}$", whereby the subtraction image data "$G_i$" is produced.

The average value calculating unit 10 produces the image block data "$S_i$" (see FIG. 6) based on the subtraction image "$G_i$". Thereafter, the coded image data "$B_i$" (see FIG. 7) is obtained from the comparing unit 12 by processing two sets of threshold values "$T_1$" and "$T_2$", and also the image block data "$S_i$".

Then, the code signals are counted by the relevant counters 46 and therefore the judging unit 14 can judge whether or not the present image data corresponds to the contrast image data (i.e., an X-ray image of the biological body 20 into which the X-ray contrast medium is injected). If YES, then the mixture signal "$S_m$" is supplied to the display unit 16 and the original image frame memory 6. Since the operation signal "$S_0$" is being supplied to close the switching element 15, the original image data stored in the original image frame memory 6 is immediately read out in response to this mixture signal "$S_m$", whereby the above-described original image data is furnished to the display unit 16 and thus, the display unit 16 displays both the original X-ray image, namely, contrast image and the mixture signal "$S_m$".

According to the first X-ray imaging system 100, the operator can recognize that the contrast image judgement is correctly executed by the judging unit 14, while observing the mixture signal "$S_m$" on the display unit 16 just after the operation signal "$S_0$", is issued. As a consequence, even when the biological body 20 is positionally shifted during the X-ray imaging operation, any operator can readily and correctly recognize existence of the contrast image contained in a series of X-ray image data "$X_i$".

It should be noted although only the so-called "X-ray image data" is displayed as the reference image which can aid an operator as a "road map" in the above-described preferred embodiment, any other X-ray fluorographic images of the biological body are separately displayed through an image data display control unit (not shown in detail).

Arrangement of the Second X-ray Imaging System

Figure 13:
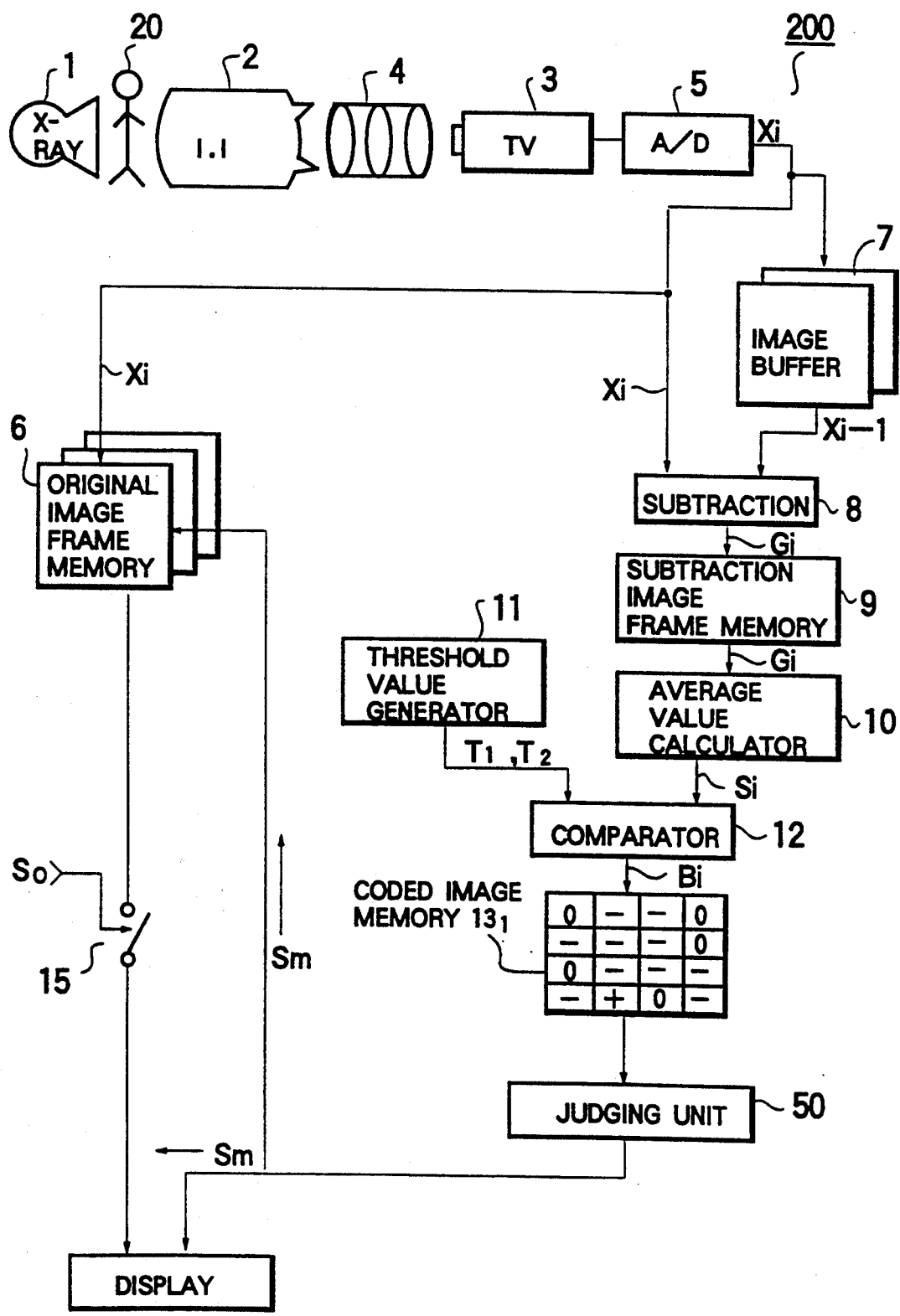
FIG. 13 is a schematic block diagram for explaining an entire arrangement of an X-ray imaging system (200) according to a second preferred embodiment of the present invention.
Figure 14:
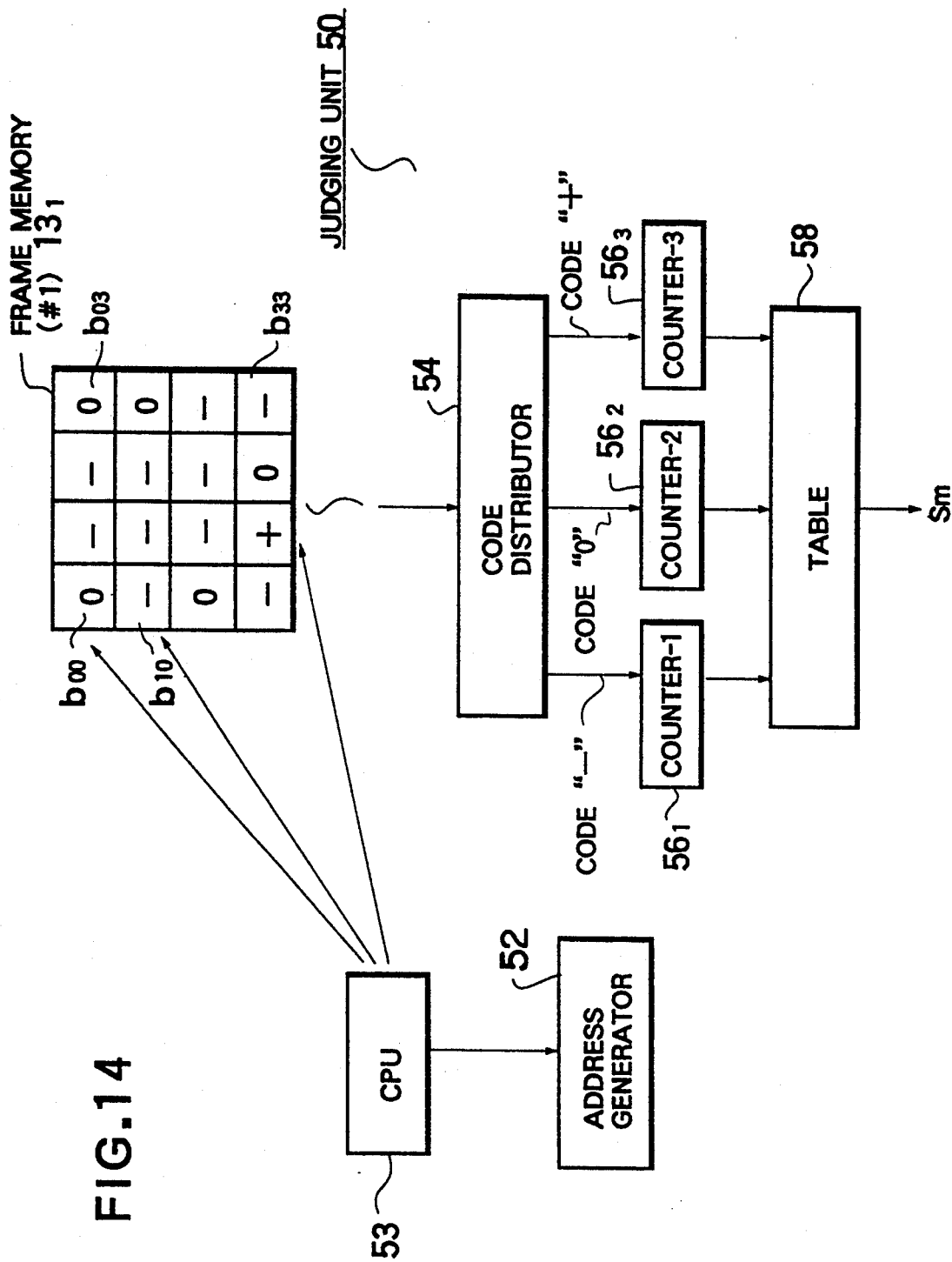
FIG. 14 is a schematic block diagram of another judging unit 50 employed in the second X-ray imaging system (200); and, FIG. 15 is a schematic block diagram of the peak trace unit 80 employable in the second X-ray imaging system (200).

FIG. 13 is a schematic block diagram of an X-ray imaging system 200 according to a second preferred embodiment of the present invention. FIG. 14 schematically illustrates an internal circuit arrangement of a judging unit 50 in conjunction with a single coded image frame memory $13_1$, which constitutes a major arrangement of the second X-ray imaging system 200.

As apparent from these drawings, the feature of the second X-ray imaging system 200 is to employ only one coded-image frame memory $13_1$ and a new judging unit 50.

In this new judging unit 50, there are provided an address generator 52; a central processing unit 53; a code distributor 54; three counters $56_1$, $56_2$, $56_3$; and a table memory 58.

Contrast Image Judgement in Second X-ray Imaging System

Referring now to FIGS. 13 and 14, a contrast image judgement performed in the second X-ray imaging system 200 will be described.

Since acquisition of the coded image data "$B_i$" performed in the second X-ray imaging system 200 is the same as in the first X-ray imaging system 100 shown in FIG. 1, no further explanation is made in the following description.

It is assumed that coded image data "$B_i$" are stored in the frame memory $13_1$ as represented in FIG. 14.

The address generator 52 successively generates address data under control of CPU 53, so that the symbols O, $-$, $+$ of the coded image data "$B_i$" are successively read out from the respective memory regions $b_{00}$, ---, $b_{33}$. The read symbols are supplied to the code distributor 54, whereby a code ($-$) signal, a code (0) signal and a code ($+$) signal are distributed to the corresponding counters $56_1$, $56_2$, $56_3$. The table memory 58 previously stores a conversion table.

In general, when an X-ray contrast medium is inserted into a preselected image of the biological body 20, the resultant coded image data contains a large number of code ($-$) signals and a small number of code ($+$) signals. To the contrary, when the biological body 20 is positionally shifted, the resultant coded image data contains substantially equal numbers of both the code ($-$) signal and the code ($+$) signals. As a consequence, a quick judgement can be achieved based upon the above-described judging basis when the contrast medium is injected into the observed image region of the biological body 20.

Referring back to FIG. 14, when the count value of the first counter $56_1$ for the code ($-$) signal is substantially equal to the count value of the third counter $56_3$ for the code ($+$) signal, which are supplied to the conversion table of the table memory 58, no mixture signal "$S_m$" is issued from this judging unit 50, because this condition of the coded image data implies the positional shift of the biological body 20 by making such a judgement based on the above-described judging basis.

To the contrary, when the count value (namely, code ($-$) signals) of the first counter $56_1$ is considerably greater than the count value (namely, code ($+$) signals) of the third counter $56_3$, the mixture signal "$S_m$" is produced from the judging unit 50, because the present coded image data corresponds to the contrast image data.

As previously described, in accordance with the second X-ray imaging system 200 employing the above-explained judging unit 50, such a quick judgement whether or not the present coded image data corresponds to the contrast image data can be achieved, as compared with the first X-ray imaging system 100.

Modification

As apparent from the foregoing descriptions, the X-ray imaging system according to the present invention is not restricted to the above-described preferred embodiments, but may be changed, modified and substituted without departing from the technical spirit and scope of the invention.

In the second X-ray imaging system 200, the threshold value generating unit 11 generates first and second threshold values "$T_1$" and "$T_1$". However, the present invention is not limited thereto. For example, if this threshold value generating unit 11 may alternatively generate four different threshold values $T$, $T_2$, $T_3$ and $T_4$, the following symbol conversion is performed. If an averaged value within an image block is smaller than the first threshold value $T_1$, a code "$--$" is produced. If another averaged value is between the first and second threshold values $T_1$ and $T_2$, then another code "$-$" is produced. If another averaged value is between the second and third threshold values $T_2$ and $T_3$, then another code "0" is obtained. Similarly, if a value is between $T_3$ and $T_4$, then a code "$+$" is issued. If a value is greater than $T_4$, then a code "$++$" is obtained. Then, a total number of respective codes is counted by the relevant counter as shown in FIG. 14, by employing further counters 56, for instance, 8 counters. Thus, the table memory 58 stores another new conversion table formed based on another judgement basis. When the total number of code "++" is at least 1, and the total numbers of codes "−" and "−−" are substantially equal to zero, the judging unit 50 may judge that the present coded image corresponds to the contrast image.

As a consequence, precision on the contrast image judgement can be furthermore improved, as compared with the second X-ray imaging system 200.

Although the mixture signal "$S_m$" is supplied to the original image frame memory 6, this mixture signal "$S_m$" may be utilized as a trigger signal for starting a peak trace of the original X-ray image data "$X_i$".

For instance, a peak trace unit 80 as shown in FIG. 15 is newly employed instead of the original image frame memory 6 (see FIGS. 1 and 13).

In FIG. 15, when the mixture signal "$S_m$" supplied from, for instance, the judging unit 14 is "active", the image data having the lowest pixel values remains in the frame memory 84. That is to say, even when the X-ray contrast medium disappears from the relevant image area, the image data whose image condition is the most high concentration are maintained in the frame memory 84. The image data outputted from the frame memory 84 are continuously supplied to the display unit 16. If the X-ray image is displayed on the display unit 16 just before the signal condition of the mixture signal "$S_m$" is changed from the "active" state to the "inactive" state, the X-ray images of the biological body 20 into which the contrast medium is injected can be continuously displayed, which may be utilized as a reference X-ray image while operating a catheter.

More specifically, the comparator 82 of the peak trace unit 80 compares the X-ray original image data "$X_i$" with the previously stored image data in accordance with a pixel-by-pixel basis and then outputs the smaller (concentration value) data to a selector 86. Then, all of pixel data are scanned within one frame. When the mixture signal "$S_m$" is "inactive", the X-ray original image data "$X_i$" is directly supplied to the frame memory 84 under control of the selector 86. Conversely, when the mixture signal "$S_m$" is "active", the image data namely, smaller data) is supplied via the selector 86 to the frame memory 84 to be newly written in the relevant memory region thereof. As a result, while the mixture signal "$S_m$" is "active", the smallest image data is stored in the relevant memory region of the frame memory 84. This operation is performed over all pixels in a pixel-by-pixel mode. Consequently, just before the mixture signal "$S_m$" becomes again "inactive", even if the contrast medium has disappears, the image data having the highest concentration value is left in the relevant memory region of the frame memory 84.

The above-described peak trace operation per se is known from, for instance, Japanese KOKAI Disclosure patent NO. 59-110293 (1984), NO. 61-252779 (1986), NO. 62-167540 (1987) and NO. 1-178241 (1989).

what is claimed is:

1. An X-ray imaging method comprising the steps of:
acquiring a plurality of X-ray images of a biological body under medical examination;
subtracting at least two of the X-ray images from each other acquired at temporally different timings to obtain a subtraction image;
subdividing one subtraction image into a plurality of image blocks;
calculating an averaged value of image concentration with respect to each of the image blocks, thereby obtaining a plurality of averaged values for each of the plurality of image blocks;
calculating a difference between at least two of said charged values of image concentration with respect to the image blocks acquired within substantially same temporal timing period; and,
judging whether one of said plurality of X-ray images is acquired under such a condition that an X-ray contrast medium appears therein based upon the difference in said two averaged values of image concentration.

2. An X-ray imaging method as claimed in claim 1, further comprising the step of:
coding said averaged value of image concentration for the image blocks by comparing said averaged value with a threshold value to obtain coded-image data, whereby it is judged whether the X-ray image is acquired under such a condition that an X-ray contrast medium appears therein based n the coded image data.

3. An X-ray imaging method as claimed in claim 2, wherein at least two different threshold values are employed.

4. An X-ray imaging method as claimed in claim 1, wherein said one subtraction image is subdivided into at least four image blocks.

5. An X-ray imaging system comprising:
means for producing a plurality of X-ray images of a biological body under medical examination;
subtraction means for subtracting at least two of the X-ray images with each of the produced at temporally different timings to obtain a subtraction image;
subdividing means or subdividing said subtraction image into a plurality of image blocks;
averaging means for obtaining an averaged value of image concentration for each of image blocks subdivided from one subtraction image, thereby obtaining a plurality of averaged values for the image blocks;
calculating means for calculating a difference between at least two of said averaged values of image concentration with respect to the image blocks acquired within substantially same temporal timing period; and
judging means for judging whether one of the plurality of X-ray times is acquired under such a condition that an X-ray contrast medium appears therein based upon the difference in said two averaged values of image concentration.

6. An X-ray imaging system as claimed in claim 5, wherein said averaging means is constructed of at least accumulating means for accumulating said plurality of X-ray images, and subtracting means for performing a subtraction among the accumulated X-ray images, whereby said averaged values of image concentration are obtained.

7. An X-ray imaging system as claimed in claim 5, wherein said calculating means includes:
threshold value generating means for generating at least a first threshold value and a second threshold value; and,
comparing means for comparing at least two image blocks based upon said first and second threshold values so as to obtain coded-image data reflecting said difference in said two averaged values of image concentration.

8. An X-ray imaging system as claimed claim 7, further comprising:
a plurality of frame memories each having a plurality of memory regions coupled to said comparing means for storing a plurality of coded-image data derived from said comparing means.

9. An X-ray imaging system as claimed in claim 8, wherein said judging means includes:
address generating means for generating a plurality of address data;
first table memory means having a first conversion table, for converting the coded-image data read from each of said plurality of memory regions of each of said plurality of frame memories simultaneously addressed by the same address data into a plurality of code signals based upon the first conversion table;
plural counting means for counting a total number of each of said code signals, while reading all of said plurality of said memory regions of said plurality of frame memories; and
second gable memory means having a second conversion table, for converting said total number o the code signals into a contrast-image present signal based upon the second conversion able, whereby a judgement is made whether or not the X-ray image is acquired under such a condition that the X-ray contrast medium appears therein based upon said contrast-image present signal.

10. An X-ray imaging system as claimed in claim 8, further comprising:
one frame memory coupled to said comparing means for storing one piece of said coded-image data.

11. An X-ray imaging system as claimed in claim 10, wherein said judging means includes:
address generating means for sequentially generating address data;
code distributing means for distributing code signals reflecting said coded-image data;
plural counting means for counting a total number of each of said code signals while reading an entire memory region of said single frame memory; and,
a table memory having a conversion table coupled to said counting means, for converting said total numbers of code signals into a contrast-image present signal based upon the conversion table, whereby a judgement is established whether the X-ray image is acquired under such a condition that the X-ray contrast medium appears therein based upon the contrast-image present signal.

12. An X-ray imaging system as claimed in claim 7, wherein said threshold value generating means of said calculating means further generates a third threshold value and a fourth threshold value, which are different from said first and second threshold values.

13. An X-ray imaging system as claimed in claim 5, further comprising a peak trace unit including:
X-ray image frame memory means for sequentially receiving said plurality of X-ray image to be stored therein; and,
comparator means for comparing said X-ray images with each other which are successively produced by said producing means and derived from said X-ray image frame memory means, so as to obtain X-ray image data having a lowest concentration value from concentration values for all of the compared image data, whereby a plurality of said X-ray image data having the lowest concentration value are continuously derived from said peak trace unit.

* * * * *

UNITED STATES PATENT AND TRADEMARK OFFICE
CERTIFICATE OF CORRECTION

PATENT NO. : 5,233,989
DATED : August 10, 1993
INVENTOR(S) : Michitaka Honda

It is certified that error appears in the above-indentified patent and that said Letters Patent is hereby corrected as shown below:

```
Claim 1, column 12, line  8, change "charged" to --averaged--.
Claim 2, column 12, line 23, change "n" to  --on--.
Claim 5, column 12, line 38, change "or" to --for--.
Claim 5, column 12, line 51, change "times" to --images--.
Claim 8, column 13, line 26, change "gable" to --table--.
Claim 8, column 13, line 27, change "o" to --of--.
Claim 8, column 13, line 29, change "able" to --table--.
```

Signed and Sealed this

Thirty-first Day of May, 1994

Attest:

BRUCE LEHMAN

*Attesting Officer*     *Commissioner of Patents and Trademarks*